United States Patent
Hagano et al.

(10) Patent No.: US 8,893,754 B2
(45) Date of Patent: Nov. 25, 2014

(54) TANK OPENING-CLOSING DEVICE

(75) Inventors: Hiroyuki Hagano, Aichi-ken (JP);
Masayuki Nakagawa, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 1299 days.

(21) Appl. No.: 12/320,153

(22) Filed: Jan. 21, 2009

(65) Prior Publication Data

US 2009/0189106 A1    Jul. 30, 2009

(30) Foreign Application Priority Data

Jan. 24, 2008   (JP) .................................. 2008-13473

(51) Int. Cl.
*B65B 1/04*   (2006.01)
*B60K 15/04*   (2006.01)

(52) U.S. Cl.
CPC ............. *B60K 15/04* (2013.01); *B60K 15/0406* (2013.01); *B60K 2015/0429* (2013.01)
USPC .............................. 141/350; 141/348; 141/349

(58) Field of Classification Search
USPC ........................... 141/348, 349, 350; 220/86.2
See application file for complete search history.

(56) References Cited

U.S. PATENT DOCUMENTS

| | | | | |
|---|---|---|---|---|
| 4,881,655 A | * | 11/1989 | Jansky et al. | 220/203.18 |
| 6,983,773 B1 | * | 1/2006 | Hagano et al. | 141/350 |

FOREIGN PATENT DOCUMENTS

| | | |
|---|---|---|
| JP | 07-096959 A | 4/1995 |
| WO | WO 02/26515 | 4/2002 |
| WO | WO 2008/013325 A1 | 1/2008 |

* cited by examiner

*Primary Examiner* — Christopher Kim
(74) *Attorney, Agent, or Firm* — Posz Law Group, PLC

(57) ABSTRACT

The tank opening-closing device is equipped with a tank opening forming member having a fuel path for leading fuel supplied from the fueling gun through the inlet to the fuel tank, a valve opening-closing mechanism having an opening-closing member and spring that closes in a state with the inlet sealed, and an opening-closing activation mechanism for opening and operating the opening-closing member. The opening-closing activation mechanism has an operating member pivoted at the tank opening forming member, and a pressing member for pressing the opening-closing member formed on the operating member, and is constituted so that by the operating member being pressed by the fueling gun and rotating, the opening-closing member is pressed by the pressing member and is rotated in the opening direction so as to open the inlet.

13 Claims, 15 Drawing Sheets

TANK OPENING-CLOSING DEVICE

This application claims the benefit of and priority from Japanese Application No. 2008-13473 filed Jan. 24, 2008 the content of which is incorporated herein by reference.

BACKGROUND OF THE INVENTION

1. Field of the Invention

The present invention relates to a tank opening-closing device for fueling a fuel tank through a fuel path, and particularly to a mechanism for opening and closing the fuel path.

2. Description of the Related Art

The inlet of the inlet pipe for fueling an automobile is typically sealed by a fuel cap that is attached and detached by a rotation operation. This kind of fuel cap not only has poor operability because a plurality of rotation operations is required when fueling, but there was also the problem that when removed, one could forget where the cap was left or could forget to close the cap, so it was necessary to come up with a means for preventing loss. To address these kinds of problems, the fueling device noted in International Patent Publication Pamphlet No. 02/26515 is known. The fueling device is equipped with a first shutter mechanism having a first closing body for opening and closing a first seal aperture, a second shutter mechanism having a second closing body for opening and closing a second seal aperture, and a link mechanism for linking so as to do the opening and closing operation of the second closing body moving in conjunction with the opening and closing operation of the first closing body, and when fueling, when the first closing body is pressed by the fueling gun, the second closing body moves in conjunction via the link mechanism, and opens the second seal aperture.

However, with the conventional fueling device, the first closing body is pressed by the fueling gun, and there was the problem that the force when doing the opening operation of the second closing body is large, so the fueling operability was poor. Also, there was the problem that the link mechanism for having the first closing body and the second closing body move in conjunction is complex, and this means there is a large number of parts.

SUMMARY

An advantage of some aspects of the invention is to provide a tank opening-closing device with a simple constitution for which the operating force for doing the opening operation of the valve opening-closing mechanism during fueling can be small.

The present invention was created in order to address at least part of the problems described above, and can be realized as the following modes or application examples.

According to an aspect of the invention, the present invention is provided with a tank opening-closing device for opening and closing an inlet for supplying fuel to a fuel tank. The tank opening-closing device comprises a tank opening forming member having the inlet, and a fuel path for leading the fuel supplied from a fueling gun to the fuel tank through the inlet, a valve opening-closing mechanism having an opening-closing member that closes with the inlet with air-tight sealing and is pivoted at the tank opening forming member, and a spring for biasing the opening-closing member in a closing direction, and an opening-closing activation mechanism having an operating member pivoted at the tank opening forming member, and a pressing member for pressing the opening-closing member and formed on the operating member. The opening-closing member opens the inlet when the opening-closing member is pressed by the pressing member according to a pressing force applied by the fueling gun via the operating member.

With the tank opening-closing device of application example 1, when the operating member axially supported on the tank opening forming member is pressed by the operating force of the fueling gun or the like, the operating member is rotated in the opening direction and the opening-closing member of the opening-closing mechanism is pressed by the pressing member. The opening-closing member opens the inlet by resisting the spring force of the spring closing direction and performing the opening operation. Then, fuel from the fueling gun is supplied to the fuel tank through the fuel path. Then, when fueling ends, and the fueling gun is removed, the force that had been applied to the operating member is cancelled, so for the opening-closing member, by the spring force of the spring, the opening-closing member closes in a state with the inlet sealed.

The operating force of the fueling gun or the like during fueling is not applied directly to the valve opening-closing mechanism, but rather is applied indirectly to the valve opening-closing mechanism via the operating member of the opening-closing activation mechanism, so it is possible to maintain a high level of sealing integrity without applying a large force biased toward the valve opening-closing mechanism which has a seal portion.

Also, for the opening-closing member of the valve opening-closing mechanism to close the inlet with a high level of sealing integrity, it is necessary to make the force in the closing direction by the spring larger. Also, when directly pressing the opening-closing member of the valve opening-closing mechanism using the fueling gun, as the fueling gun is inserted in the fuel path, the position at which the opening-closing member is pressed approaches the axially supported location, and a large force is required to do the opening operation of the opening-closing member. However, the present invention is able to increase the moment by arranging the opening-closing member at a distance away from the axially supported location, and thus it is possible to quickly do the opening operation of the opening-closing member even when the operating force of the fueling gun is small.

Furthermore, the opening-closing activation mechanism receives the insertion force of the fueling gun, and directly presses the valve opening-closing mechanism, so it is not necessary to provide the link mechanism that links the valve opening-closing mechanism, and it is possible to have an easy constitution and use a small number of parts.

Application example 2 can have a constitution for which the position at which the pressing member presses the opening-closing member is in the radial direction from the center of the opening-closing member and is arranged at the opposite side of the location at which the opening-closing member is axially supported. By doing this, it is possible to make the moment with which the opening-closing activation mechanism does the start operation of the opening-closing member larger.

Application example 3 can have a constitution for which the operating member is equipped with a guide recess consisting of a curved surface pressed so as to rotate the operating member while sliding the tip part of the fueling gun when the operating member is pressed by the tip part of the fueling gun. With this constitution, the opening-closing activation mechanism does guiding while the guide recess of the operating member slides the tip of the fueling gun, as well as so as to face the fueling gun toward the center of the operating member, so the insertion force of the fueling gun is conveyed efficiently to the valve opening-closing mechanism, and thus the valve opening-closing mechanism undergoes the opening and closing operation smoothly. In fact, the guide recess guides the fueling gun to the desired position of the fuel path, so the fueling work is also smooth.

Application example 4 can have a constitution for which the opening-closing member is equipped with a pressure regulating valve for regulating inner pressure of the fuel tank and atmospheric pressure within a preset range. With this constitution, it is possible to easily attach the pressure regulating valve to the opening-closing member of the valve opening-closing mechanism.

DESCRIPTION OF THE PREFERRED EMBODIMENTS

Figure 1:
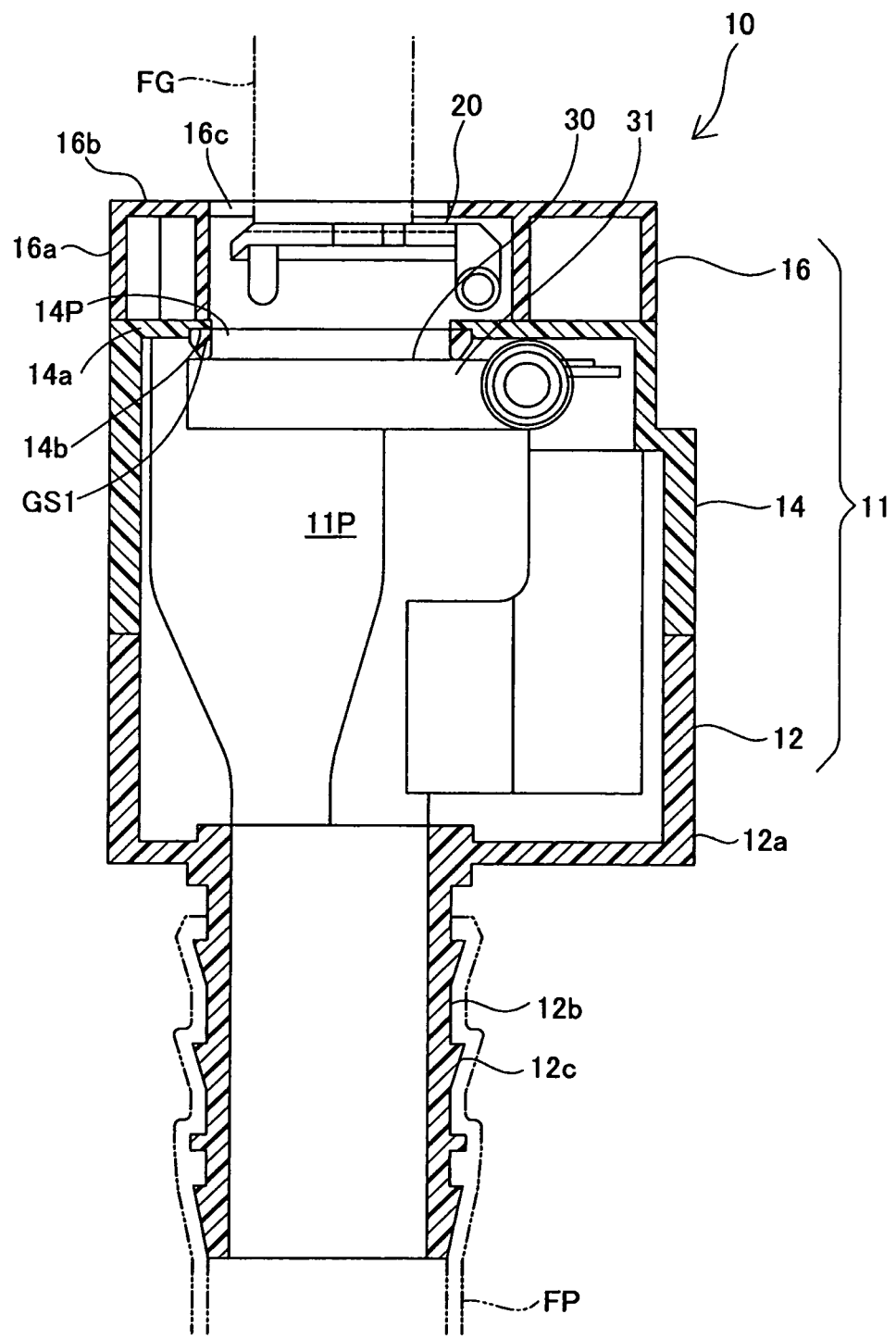
FIG. 1 is a cross section view showing the tank opening-closing device in the axis direction according to the first embodiment of the present invention.

A. First Embodiment (1) Schematic Structure of the Tank Opening-Closing Device FIG. 1 is a cross section view in the axis direction of the tank opening-closing device of the first embodiment of the present invention. The tank opening-closing device 10 is a mechanism for supplying fuel to the fuel tank (not illustrated) without using a fuel cap, in other words, it is a mechanism for supplying fuel to a fuel tank from a fueling gun by opening and closing the fuel path with the external force or the like from the fueling gun after opening the fueling lid (not illustrated). Following, we will give a detailed description of the constitution of the tank opening-closing device.

(2) Constitution of Each Part

The tank opening-closing device 10 is equipped with the tank opening forming member 11 having the fuel path 11P connected to the fuel tank, the opening-closing activation mechanism 20, and the valve opening-closing mechanism 30 that opens and closes the inlet 14P.

(2)-1 Tank Opening Forming Member 11

The tank opening forming member 11 is a tube body having the fuel path 11P, and is equipped with a connection tube 12 connected to the fuel tank, a pipe main body 14 connected to the top edge part of the connection tube 12, and an port forming member 16 fixed to the top of the pipe main body 14. The connection tube 12 is equipped with a large diameter part 12a of the same diameter as the pipe main body 14, and a straight pipe part 12b connected to the bottom of the large diameter part 12a, and these are integrally formed. A barbed portion 12c is formed at the outer periphery of the straight pipe part 12b, and this operates so as to prevent from the fuel pipe FP falling out when the fuel pipe FP connected to the fuel tank is press fit in the straight pipe part 12b.

The pipe main body 14 is connected to the top of the large diameter part 12a. The top of the pipe main body 14 has an upper wall 14a integrally fixed. The inlet 14P constituting part of the fuel path 11P is formed on the upper wall 14a. A seal holding member 14b is formed at the opening outer edge part of the inlet 14P, and holds the gasket GS1.

The port forming member 16 is mounted on the upper part of the pipe main body 14, is equipped with a cylinder shaped side wall 16a and a top wall 16b, and is mounted on the pipe main body 14 by a mechanical engagement means such as an engagement hole or engagement hook or the like of the bottom part of the side wall 16a and the upper part of the pipe main body 14. An introduction port 16c is formed for inserting the fueling gun FG in the top wall 16b.

(2)-2 Opening-Closing Activation Mechanism 20 and Valve Opening-Closing Mechanism 30

Figure 2:
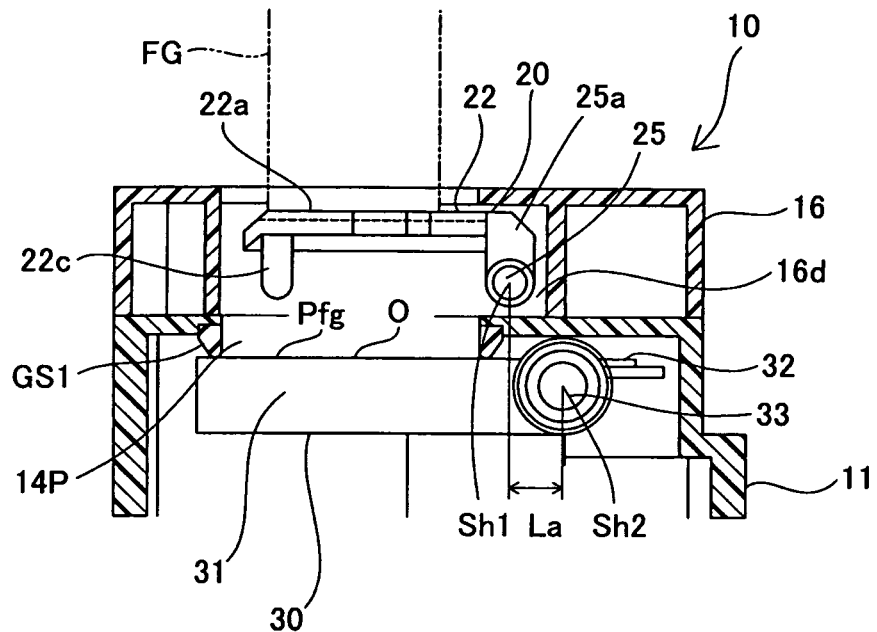
FIG. 2 is a cross section view showing the upper part of the tank opening-closing device.

FIG. 2 is a cross section view showing the upper part of the tank opening-closing device 10. The tank opening-closing device 10 is equipped with the opening-closing activation mechanism 20, and the valve opening-closing mechanism 30 which undergoes opening and closing operation by the opening-closing activation mechanism 20 and which has an opening-closing member 31 that opens and closes the inlet 14P of the tank opening forming member 11. The opening-closing activation mechanism 20 is equipped with an operating member 22, an axis support body 25 provided at one edge of the operating member 22, and a spring (not illustrated) that biases the operating member 22 in the closing direction. The axis support body 25 has the operating member 22 pivoted at the support body 16d provided standing at the port forming member 16.

Figure 3:
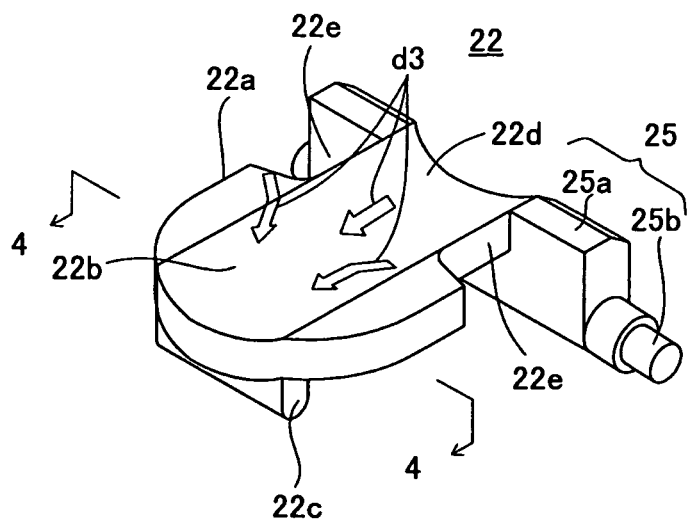
FIG. 3 is a perspective view showing the operating member.
Figure 4:
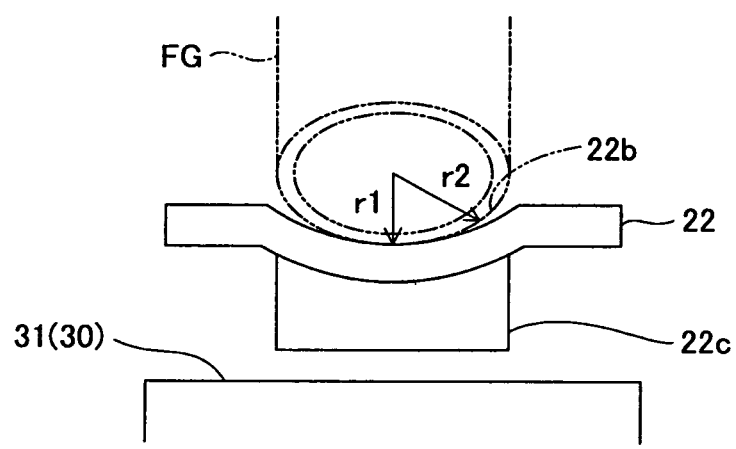
FIG. 4 is a cross section view along line 4-4 of FIG. 3.

FIG. 3 is a perspective view showing the operating member 22, and FIG. 4 is a cross section view along line 4-4 of FIG. 3. The operating member 22 is equipped with a plate shaped operating member main body 22a for which one end is an arc, a guide recess 22b formed on the top surface of the operating member main body 22a, and a pressing member 22c provided protruding from the bottom of the operating member main body 22a. As shown in FIG. 4, the guide recess 22b is pressed by the fueling gun FG, and is a curved surface guiding the fueling gun FG in the arrow d3 direction (FIG. 3), and by its curvature r1 being formed to be larger than the radius r2 of the fueling gun FG, this is formed so that the fueling gun FG moves smoothly. The pressing member 22c is a projection for pressing the opening-closing member 31 of the valve opening-closing mechanism 30, and its bottom edge has a curved surface for reducing sliding resistance with the opening-closing member 31. Returning to FIG. 3, the axis support body 25 is equipped with a support base 25a extended at both sides of the axial direction from the other edge of the operating member main body 22a, and an axis 25b provided protruding from the support base 25a. Also, the operating member main body 22a has an linking part 22d linked to the axis support body 25 narrower than the other parts, in other words, both sides of the linking body 22d are recesses 23e and 23e, and it is possible to prevent interference of the axis support body 25 with the members arranged at the periphery.

In FIG. 2, the valve opening-closing mechanism 30 is a flap valve mechanism for opening the inlet 14P by pressing the operating member 22 of the opening-closing activation mechanism 20, and this is pivoted at the tank opening forming member 11. Specifically, the valve opening-closing mechanism 30 is equipped with the opening-closing member 31 and a spring 32. The opening-closing member 31 is pivoted via the rotating axis 33 on the port forming member 16, and is an disc shaped member that opens and closes the inlet 14P. The opening-closing member 31 uses a resin material that is harder than the operating member 22 to avoid an increase in the friction resistance by preventing damage with pressing by the operating member 22. For example, the operating member 22 can be nylon, and the opening-closing member 31 can use polyacetal. The spring 32 is a coil spring, it biases the opening-closing member 31 in the closing direction, and closes the inlet 14P in a state that is sealed by compression of the gasket GS1.

(3) Operation of the Tank Opening-Closing Device 10

Figure 5:
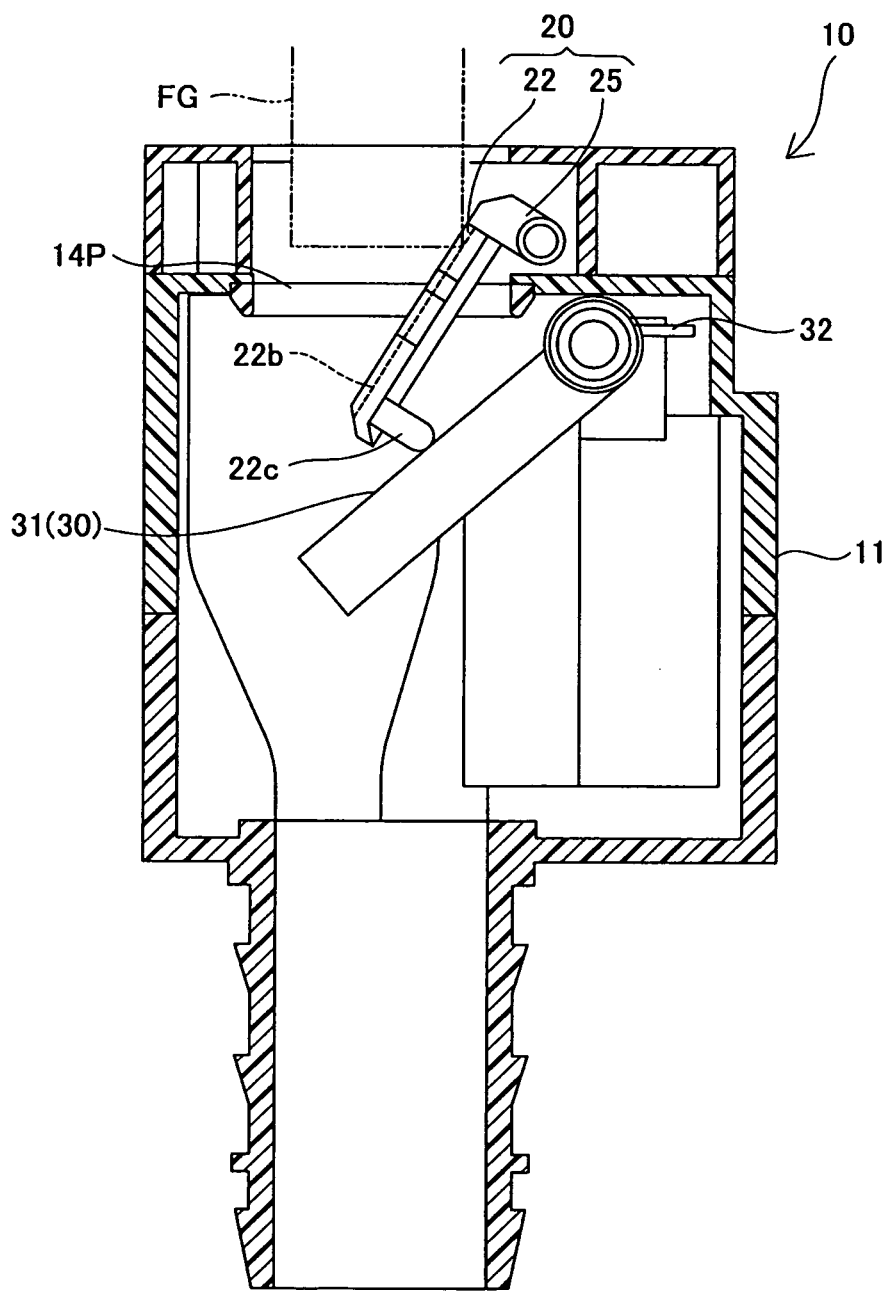
FIG. 5 shows the operation of the tank opening-closing device.
Figure 6:
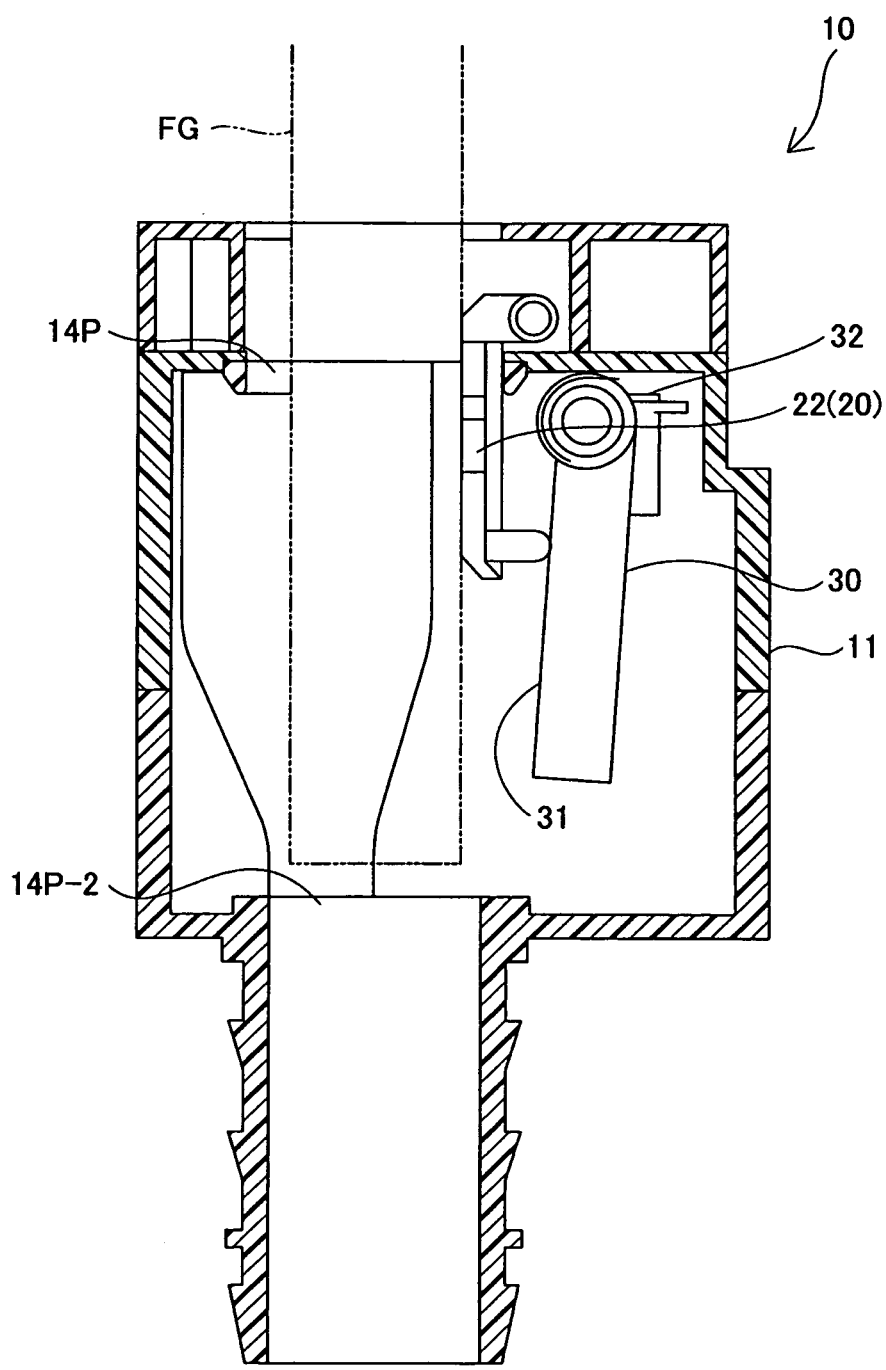
FIG. 6 shows the operation subsequent to FIG. 5.

As shown in FIG. 1, 1 when the fueling gun FG is inserted from the introduction port 16c, the tip of the fueling gun FG presses the guide recess 22b (FIG. 3) of the operating member 22. By doing this, as shown in FIG. 5, the operating member 22 rotates in the opening direction, and the pressing member 22c of the bottom of the operating member 22 presses the opening-closing member 31 of the valve opening-closing mechanism 30. Because the bottom edge of the pressing member 22c is a curved surface, the valve opening-closing mechanism 30 is opened and operated while sliding on the flat surface of the opening-closing member 31. Furthermore, as shown in FIG. 6, when the fueling gun FG is inserted, the operating member 22 and the valve opening-closing mechanism 30 are rotated almost 90° and open the inlet 14P, and the fueling gun FG is inserted in the fuel path port 14P-2 and fueling is performed. Then, when fueling ends, and the fueling gun FG is removed, the force applied to the operating member 22 is canceled, so with the spring force of the spring 32 in the valve opening-closing mechanism 30 closing direction, this returns to the state in FIG. 1.

(4) The Following Effects are Exhibited by the Constitution of the Embodiment Noted Above (4)-1 The insertion direction force of the fueling gun FG is applied indirectly to the opening-closing member 31 via the operating member 22 of the opening-closing activation mechanism 20 without being directly applied to the opening-closing member 31 of the valve opening-closing mechanism 30, so there is no application of a large force biased to the valve opening-closing mechanism 30 which has a seal portion, and it is possible to maintain a high level of sealing integrity.

(4)-2 In FIG. 2, for the opening-closing member 31 of the valve opening-closing mechanism 30 to close the inlet 14P with a high level of sealing integrity, it is necessary to use a large force by the spring 32 in the closing direction. Also, when directly pressing the opening-closing member 31 of the valve opening-closing mechanism 30 using the fueling gun FG, as the fueling gun FG is inserted into the fuel path, the position pressed by the opening-closing member 31 approaches the rotating axis 33, and a large force becomes necessary to do the opening operation of the opening-closing member 31. However, the present invention is able to increase the moment by having the position at which the pressing member 22c of the operating member 22 presses the opening-closing member 31 be in a radial direction from the center O of the disk shaped opening-closing member 31 excluding the rotating axis 33, and having this be the position Pfg at the opposite side of the rotating axis 33, and thus, even when the operating force of the fueling gun FG is made small, it is possible to quickly open and operate the opening-closing member 31.

(4)-3 The opening-closing activation mechanism 20 receives the insertion force of the fueling gun FG, and directly presses the valve opening-closing mechanism 30, so it is not necessary to provide a link mechanism for linking to the valve opening-closing mechanism 30, so it is possible to use just a simple constitution, and to have a small number of parts.

(4)-4 In FIG. 3 and FIG. 4, the opening-closing activation mechanism 20 conveys the insertion force of the fueling gun FG to the valve opening-closing mechanism 30 while the guide recess 22b of the operating member 22 slides the tip of the fueling gun FG and also the pressing member 22c of the operating member 22 slides in relation to the opening-closing member 31 of the valve opening-closing mechanism 30, so it is possible to smoothly do the opening and closing operation of the valve opening-closing mechanism 30. In fact, the guide recess 22b guides the fueling gun FG so as to face the center of the operating member, so the insertion force of the fueling gun FG is efficiently conveyed to the valve opening-closing mechanism, and thus the opening and closing operation of the valve opening-closing mechanism is done smoothly. In fact, the guide recess 22b guides the fueling gun FG to the desired position of the fuel path, so the fueling work also goes smoothly.

(4)-5 In FIG. 2, with the pressing member 22c in a state with the valve opening-closing mechanism 30 closed by the biasing force of the spring, the operating member 22 of the opening-closing activation mechanism 20 has a constitution separated from the opening-closing member 31 of the valve opening-closing mechanism 30, and since external force due to a vehicle collision does not affect the valve opening-closing mechanism 30, a decrease in the sealing integrity of the valve opening-closing mechanism 30 is not caused, and by the operating member 22 being put into contact with the wall surface of the tank opening forming member 11 by the biasing force of the spring, it is possible to prevent the looseness that comes with the vibration of a vehicle.

(4)-6 In FIG. 2, the operating member 22 has the support base 25a and the pressing member 22c provided protruding so as to make a U shape to the bottom from both edges of the operating member main body 22a, in other words, the support base 25a extends in the axial direction upward, and in fact the shaft center Sh1 of the axis support body 25 which axially supports the operating member 22 is decentered by the distance La in the right angle direction to the axis direction in relation to the shaft center Sh2 of the rotating axis 33 that axially supports the opening-closing member 31, so interference does not occur easily with the gasket GS1, and it is possible to increase the rotating conveyance range of the valve opening-closing mechanism 30.

B. Second Embodiment

Figure 7:
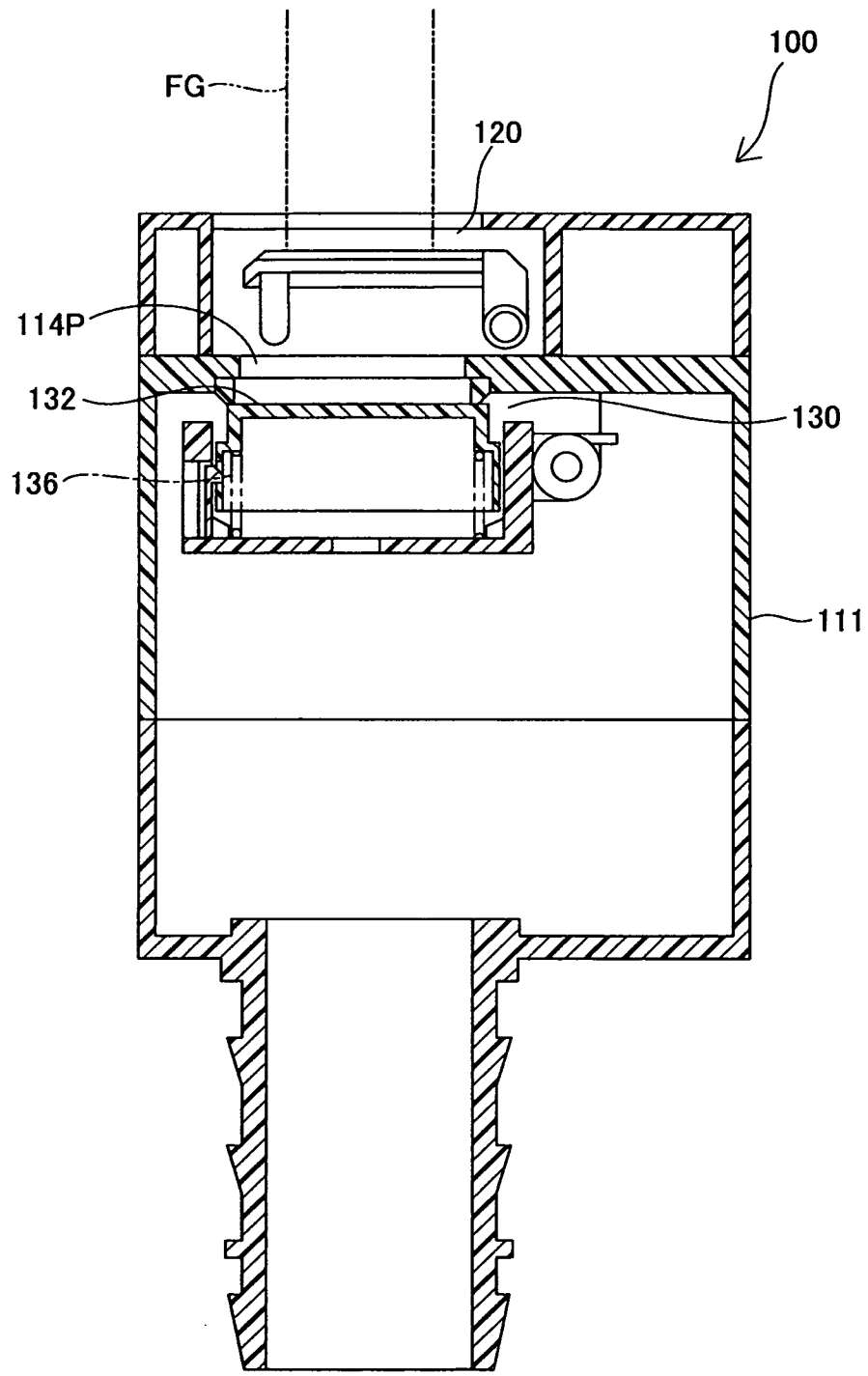
FIG. 7 is a cross section view showing the tank opening-closing device according to the second embodiment.

FIG. 7 is a cross section view showing the tank opening-closing device 100 of the second embodiment. The tank opening-closing device 100 of the second embodiment is characterized by a constitution with which a pressure regulating valve is housed in the valve opening-closing mechanism 130 supported to be able to rotate on the tank opening forming member 111. The opening-closing activation mechanism 120 has the same constitution as that of the first embodiment, and the valve opening-closing mechanism 130 is opened and closed by the insertion of the fueling gun FG.

Figure 8:
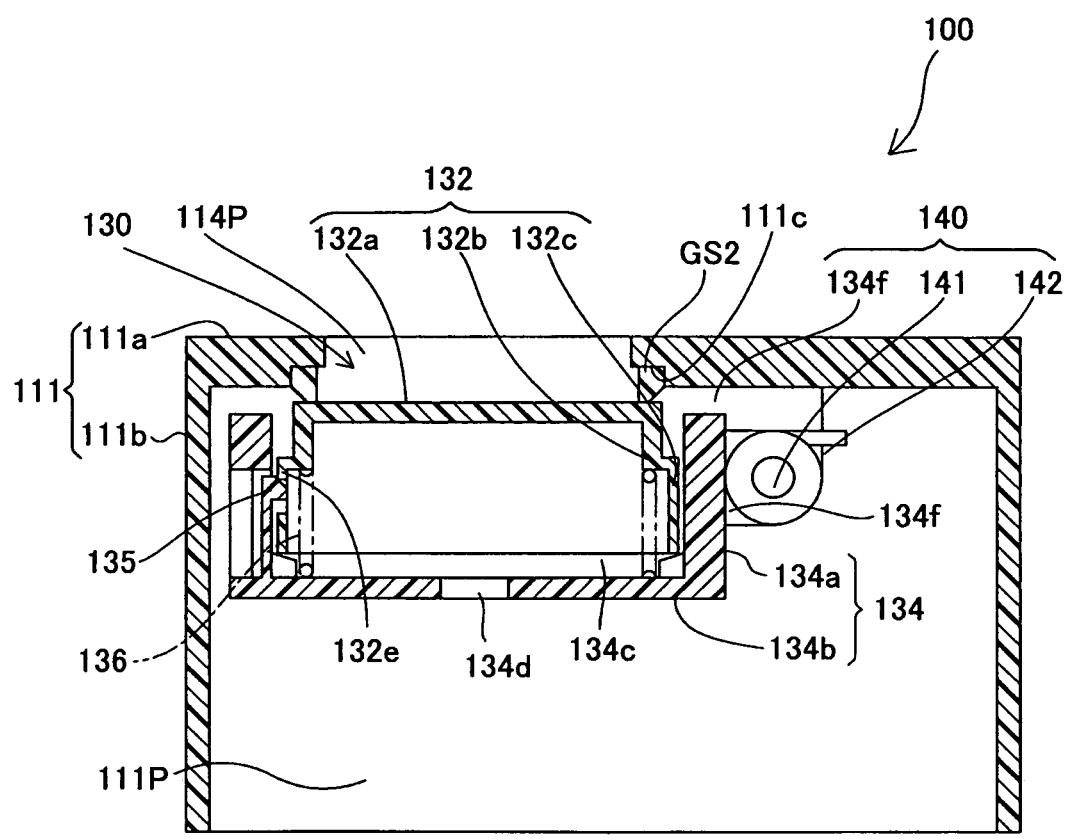
FIG. 8 is a cross section view showing the upper part of the tank opening-closing device.

FIG. 8 is a cross section view showing the upper part of the tank opening-closing device 100. The valve opening-closing mechanism 130 is equipped with a valve body 132, a valve support moving body 134, and a spring 136. The valve body 132 is equipped with a pressing member 132a for pressing on the opening-closing activation mechanism 120 (FIG. 7), the sealing body 132b formed on the outer periphery of the pressing member 132a, and a side wall 132c provided extending in a cylinder shape on the outer periphery part of the sealing body 132b, and is formed in a downward facing cap shape. The valve support moving body 134 is equipped with a side wall 134a and a bottom wall 134b formed at the bottom of the side wall 134a, formed in an upward cap shape so that the inside space becomes a valve storage chamber 134c. A continuous hole 134d connected to the valve storage chamber 134c and the fuel path 111P is formed on the bottom wall 134b. The spring 136 is biased in the closing direction of the valve body 132 supported on the bottom wall 134b. An engagement hook 135 is provided protruding facing upward on the bottom wall 134b of the valve support moving body 134. The engagement hook 135 stops the valve body 132 from falling out by engaging with the notch 132e formed in the side wall 132c.

The axis support mechanism 140 is equipped with a rotating support body 134f formed on the side wall 134a, the axis support body 141 formed on the inside wall of the tank opening forming member 111, and the spring 142 supported on the axis support body 141. The axis support mechanism 140 supports the valve opening-closing mechanism 130 so as to be able to rotate on the tank opening forming member 111 via the axis support body 141 and the rotating support body 134f of the valve support moving body 134, and is biased in the direction of the inlet 114P by the spring 142.

Figure 9:
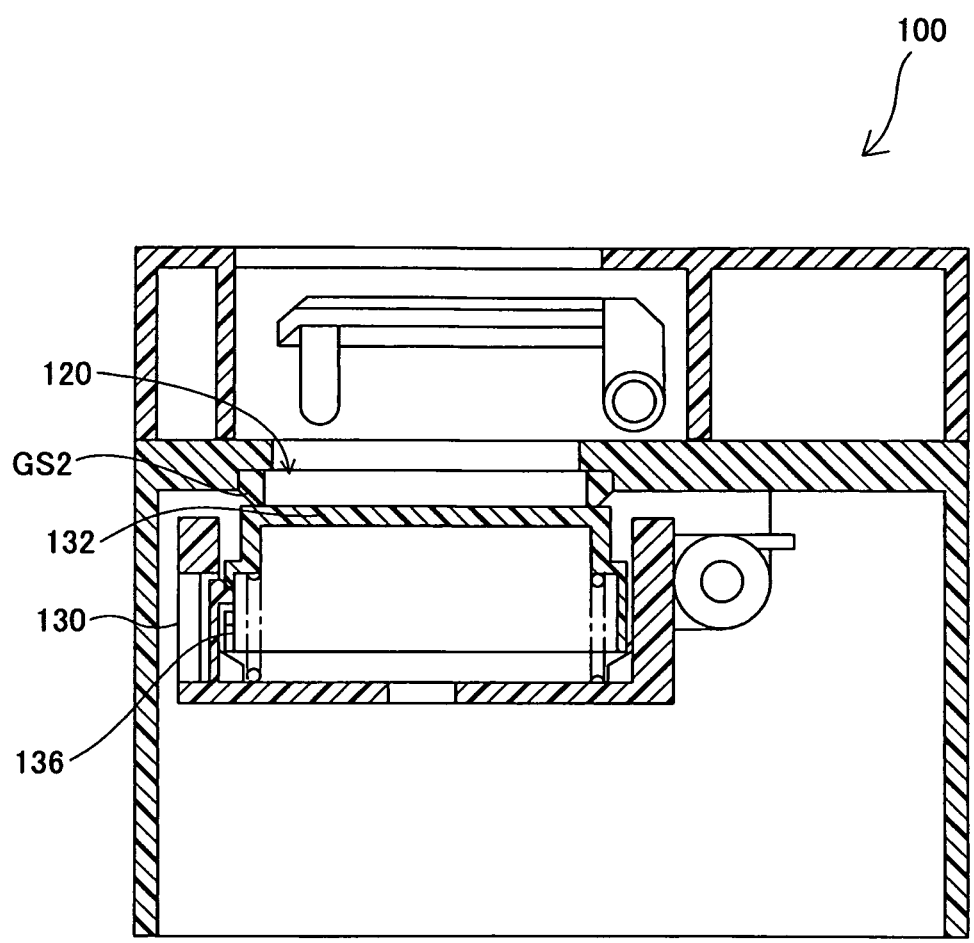
FIG. 9 shows the operation of the valve opening-closing mechanism.

With the state with the valve opening-closing mechanism 130 closed in FIG. 7, with the relationship of the force applied to the valve body 132 of the valve opening-closing mechanism 130, in other words, the relationship of the force in the opening direction by atmospheric pressure and the force in the closing direction by the tank inner pressure and the spring force of the spring 136, when there is a negative pressure state with the former exceeding the latter, as shown in FIG. 9, the valve body 132 moves downward in resistance to the biasing force of the spring 136, there is separation from the gasket GS2, and an air ventilation path is secured between these. The tank is connected to the atmosphere through this air ventilation path, and the fuel tank internal negative pressure state moves in the direction of being eliminated. Then, when the differential pressure applied to the valve body 132 is lower than the biasing force of the spring 136, the valve body 132 is closed.

Figure 10:
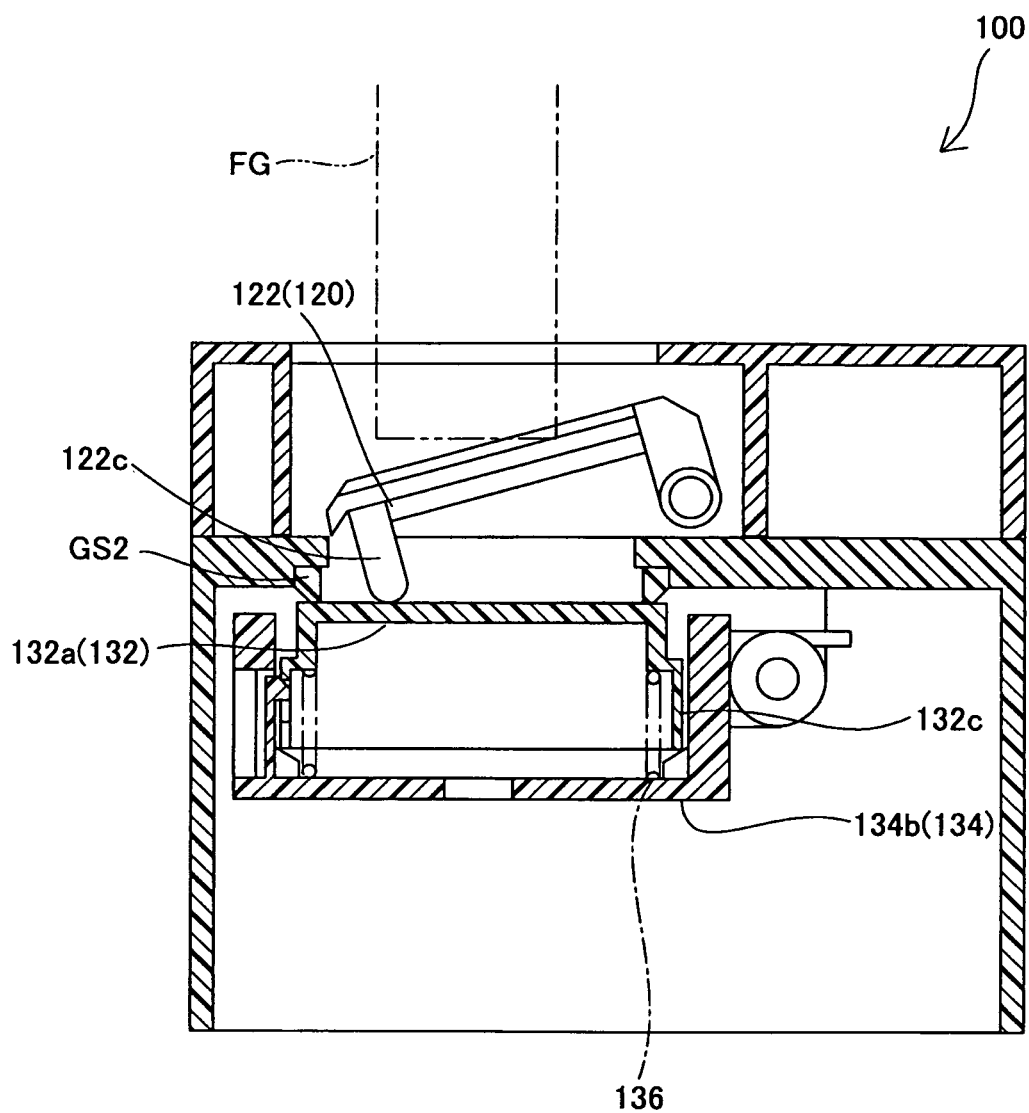
FIG. 10 shows the operation of the tank opening-closing device.
Figure 11:
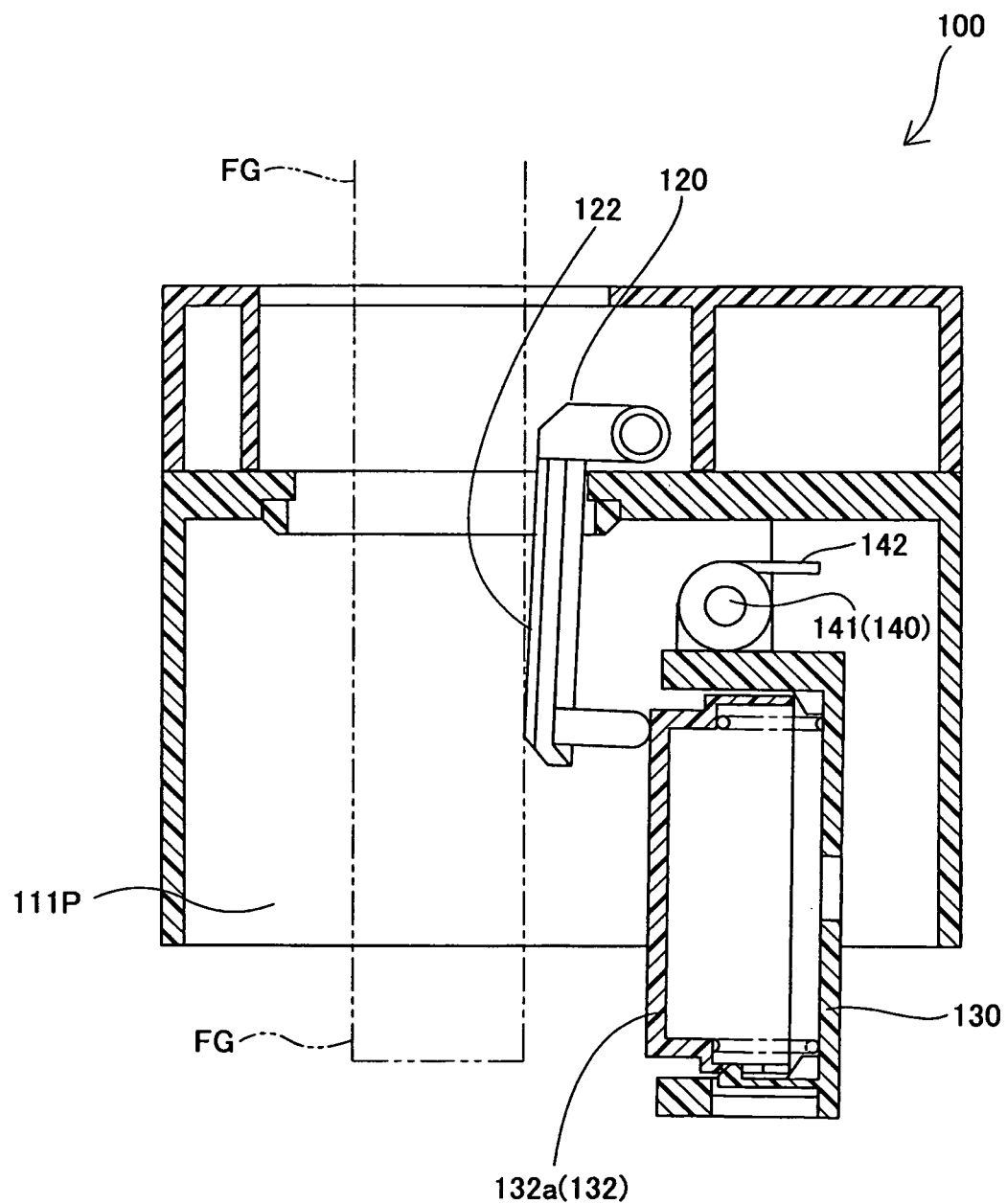
FIG. 11 is shows the operation subsequent to FIG. 10.

As shown in FIG. 10, when the operating member 122 of the opening-closing activation mechanism 120 is pressed by the fueling gun FG, the pressing member 132a of the valve body 132 is pressed by the pressing member 122c of the operating member 122, and the valve body 132 is pressed down in resistance to the spring force of the spring 136. Then, when the bottom edge of the side wall 132c of the valve body 132 is in contact with the bottom wall 134b of the valve support moving body 134, the movement of the valve body 132 is regulated. As shown in FIG. 11, when the pressing member 132a of the valve body 132 is further pressed via the operating member 122 by the fueling gun FG, this is rotated in resistance to the spring force of the spring 142 with the axis support body 141 of the axis support mechanism 140 as the center, the fueling gun FG is inserted in the fuel path 111P, and in this state, fueling is done from the fueling gun FG.

The tank opening-closing device 100 of this embodiment has the valve opening-closing mechanism 130 pivoted on the tank opening forming member 111 by the axis support mechanism 140, and by pressing with the fueling gun FG via the opening-closing activation mechanism 120, it is possible to open the inlet 114P. Also, with this embodiment, it is possible to attach the negative pressure valve to the valve opening-closing mechanism 130 using a simple constitution.

C. Third Embodiment

Figure 12:
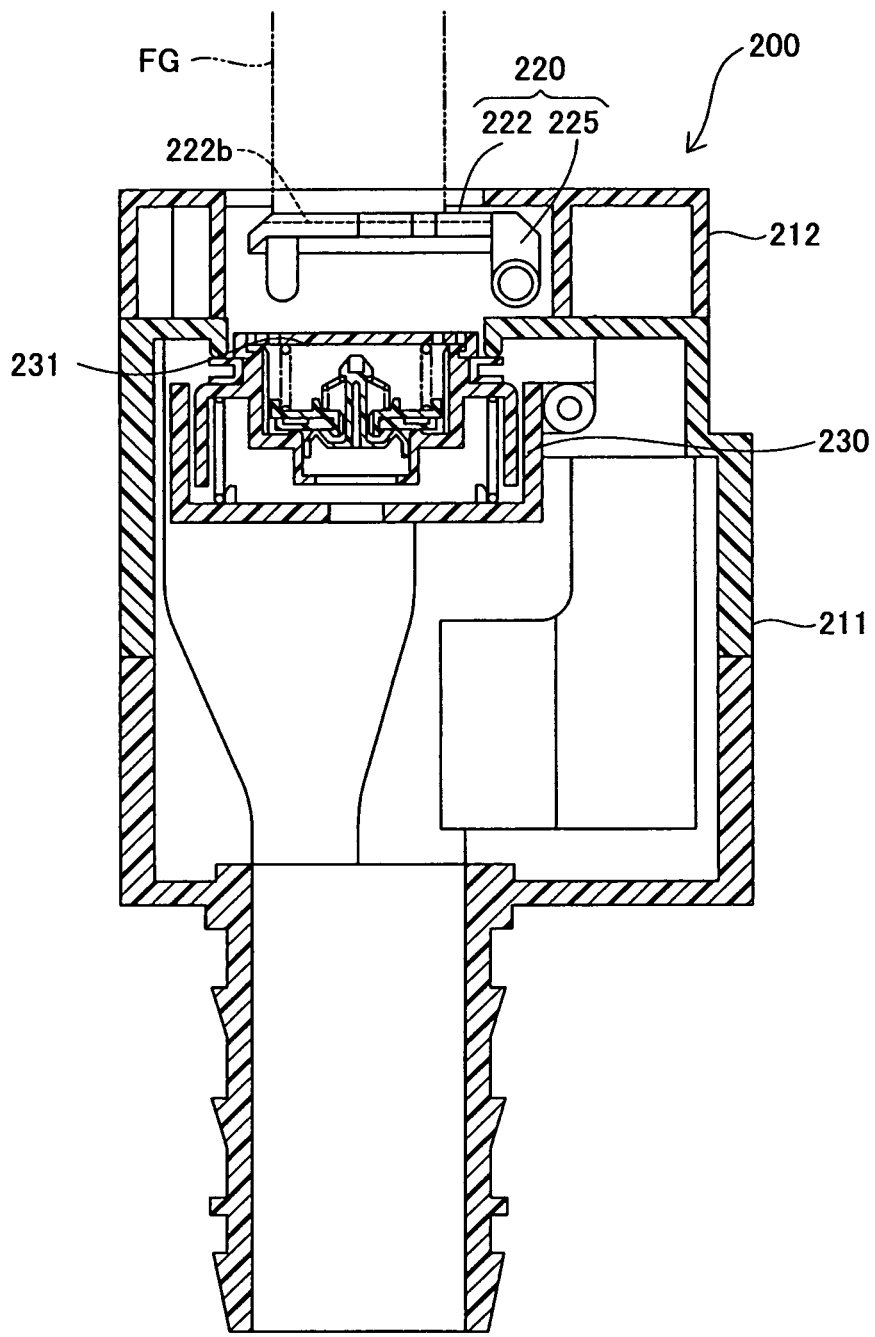
FIG. 12 is a cross section view showing the tank opening-closing device according to the third embodiment.
Figure 13:
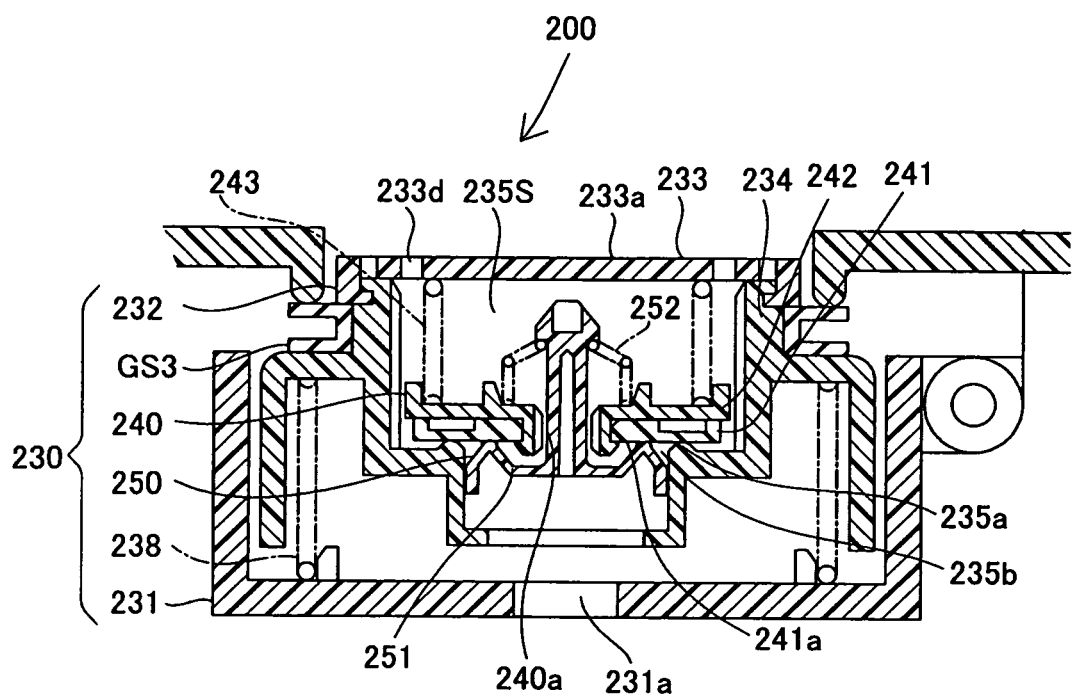
FIG. 13 is a cross section view showing the valve opening-closing mechanism.

FIG. 12 is a cross section view showing the tank opening-closing device 200 of the third embodiment, and FIG. 13 is a cross section view showing the valve opening-closing mechanism 230. The tank opening-closing device 200 of the third embodiment is characterized by having a constitution for which a pressure regulating valve constituted from a positive pressure valve and a negative pressure valve as well as a gasket GS3 are attached to the valve opening-closing mechanism 230. Specifically, the valve opening-closing mechanism 230 is equipped with a valve support moving body 231, the valve body 232, the spring 238, the gasket GS3, the positive pressure valve 240 and the negative pressure valve 250 constituting the pressure regulating valve. The valve body 232 is equipped with the pressing member 233 having the pressing part 233a for being pressed by the opening-closing activation mechanism 220 (FIG. 12) and the valve main body 234 for holding the pressing member 233.

Figure 14:
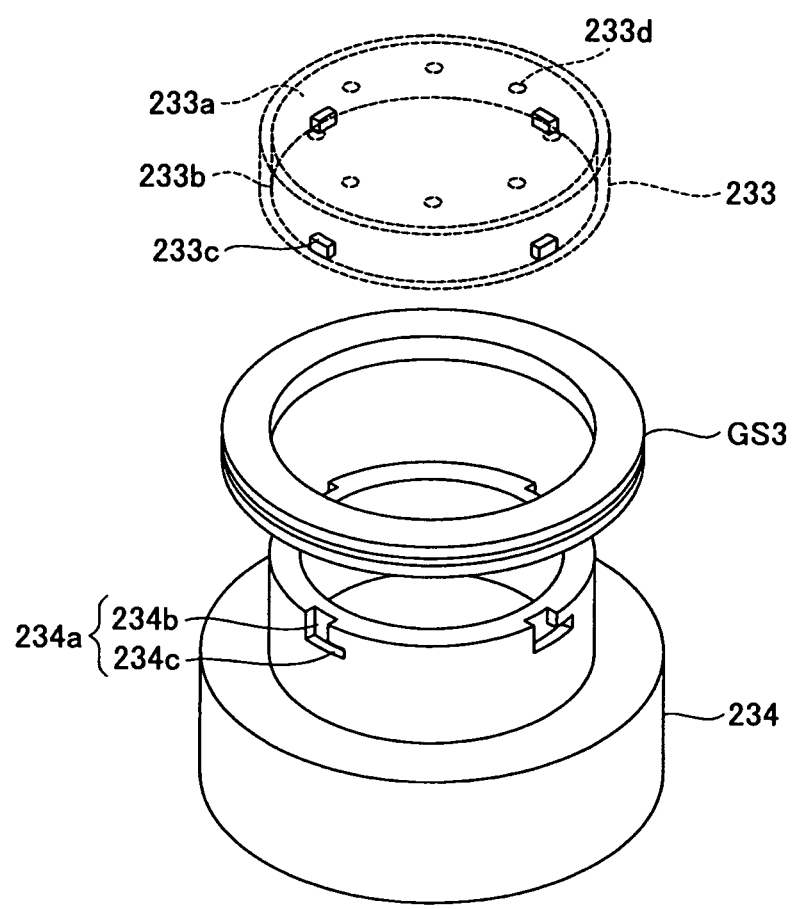
FIG. 14 is a perspective view showing the state with the pressing member removed from the valve main body.

FIG. 14 is a perspective view showing the state with the pressing member 233 removed from the valve main body 234. The pressing member 233 is equipped with a cylinder shaped mounting body 233b formed on the outer periphery part of the pressing part 233a. The mounting body 233b is a site for mounting to the valve main body 234, and the locking projection 233c is formed at four locations on its inner wall. An L shaped mounting groove 234a is formed at four locations on the outer periphery of the top of the valve main body 234. With the pressing member 233, when rotation is done after the locking projection 233c is positioned at the vertical part 234b of the mounting groove 234a and pressed in, by the locking projection 233c engaging with the horizontal part 234c of the mounting groove 234a, the pressing member 233 is mounted in the valve main body 234. With FIG. 13, an air ventilation hole 233d is formed on the pressing member 233, and an air ventilation hole 231a is formed on the bottom of the valve support moving body 231.

Figure 15:
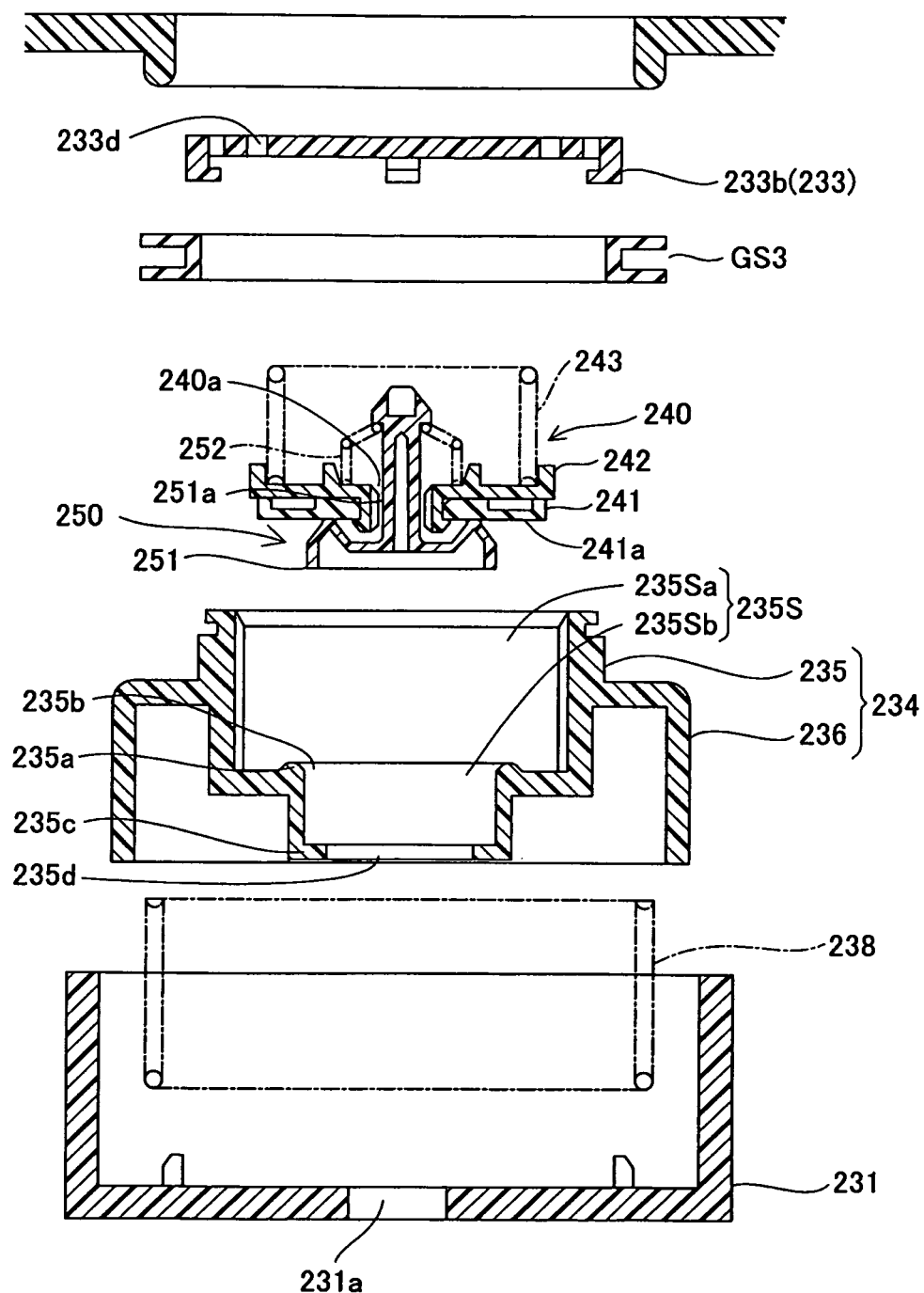
FIG. 15 is a cross section view showing an exploded view of the tank opening-closing device.

FIG. 15 is a cross section view showing an exploded view of the tank opening-closing device 200. The valve main body 234 is equipped with a valve chamber forming body 235 that forms a valve chamber 235S, and a spring support body 236 formed in a cylinder shape at the outer periphery part of the valve chamber forming body 235. The positive pressure valve 240 and the negative pressure valve 250 are housed in the valve chamber 235S of the valve chamber forming body 235. The spring 238 is supported by the spring support body 236 between it and the bottom surface of the valve support moving body 231.

The gasket GS3 is held by being gripped by the spring support body 236 and the pressing member 233. Specifically, the gasket GS3 has a cross section U shape, is mounted on the upper part of the spring support body 236, and by being pressed by the bottom part of the mounting body 233b of the pressing member 233, is held on the valve main body 234.

The positive pressure valve 240 and the negative pressure valve 250 are housed in the valve chamber 235S of the valve chamber forming body 235, and the tank inner pressure is adjusted within a specified pressure by cutting off the connection of the path within the valve chamber 235S. The positive pressure valve 240 is arranged at the upper chamber 235Sa of the valve chamber 235S, and the negative pressure valve is arranged at the lower chamber 235Sb. A first seat part 235a is formed on the inner periphery part for which the diameter is reduced from the inside of the valve chamber forming body 235 which is between the upper chamber 235Sa and the lower chamber 235Sb. This valve flow path 235b is connected to the continuous hole 235d formed on the bottom part 235c of the valve chamber forming body 235, and furthermore is connected to the fuel path via the air ventilation hole 231a from the continuous hole 235d.

The positive pressure valve 240 is equipped with the positive pressure valve body 241 made of rubber that opens and closes the valve flow path 235b, the valve holding member 242, and the first spring 243 which is supported by the bottom surface of the pressing member 233 and applies biasing force in the closing direction in relation to the positive pressure valve body 241 via the valve holding member 242. Also, at the center part of the positive pressure valve body 241 and the center part of the valve holding member 242 is formed a through-hole 240a, and outside air is led to the negative pressure valve 250 via the through-hole 240a.

The negative pressure valve 250 is equipped with the negative pressure valve body 251 made from resin, and the second spring 252 biased to the negative pressure valve body 251. A valve support rod 251a is provided projecting upward at the center part of the negative pressure valve body 251. The valve support rod 251a passes through the through-hole 240a of the positive pressure valve body 241 and the valve holding member 242, and at the top edge of this, supports the second spring 252 between it and the valve holding member 242.

In FIG. 13, the pressure adjustment within the fuel tank by the positive pressure valve 240 is performed using the following operation. When the pressure inside the fuel tank exceeds a specified positive pressure value, the positive pressure valve body 241 and the valve holding member 242 rise in resistance to the biasing force of the first spring 243, and the fuel tank interior, through the valve flow path 235b of the valve chamber 235S and the like, has outside air connected and moves in the direction of eliminating the positive pressure state inside the fuel tank. Meanwhile, when the fuel tank interior goes below a specified negative pressure value and becomes a negative pressure, the negative pressure valve body 251 moves downward in resistance to the biasing force of the second spring 252, and the negative pressure valve body 251 is separated from the second seating part 241a of the positive pressure valve body 241. At this time, the positive pressure valve body 241 is seated on the first seating part 235a, and to maintain that state, a path is formed between the negative pressure valve body 251 and the positive pressure valve body 241. By doing this, through the pressing member 233 air ventilation hole 233d and the valve holding member 242 through-hole 240a and the like, the fuel tank is connected to the atmosphere and moves in the direction of eliminating the negative pressure state inside the fuel tank.

Also, by setting the spring force of the spring 238 to be greater than the spring force of the first spring 243 that opens the positive pressure valve 240 and making the opening valve pressure large, it is possible to increase the function of backing up the fuel tank.

D. Other Embodiments

This invention is not limited to the embodiments noted above, and it is possible to carry out various modes in a scope that does not stray from the key points, for example the following kinds of variation examples are possible.

Figure 16:
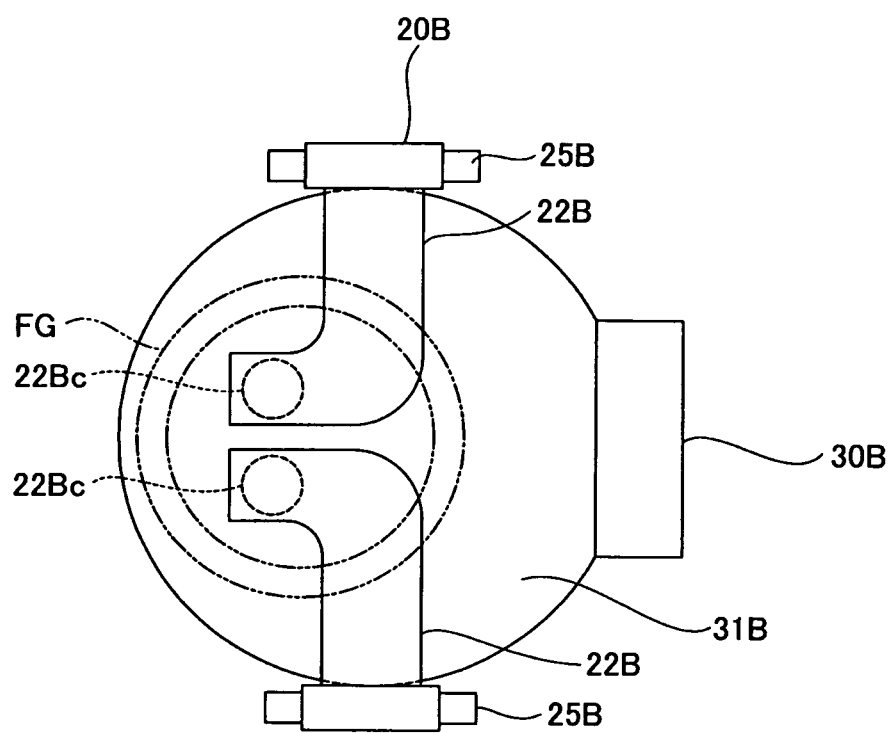
FIG. 16 shows the tank opening-closing device of another embodiment viewed from above.

(1) FIG. 16 is an explanatory drawing of the tank opening-closing device of another embodiment viewed from above. The opening-closing activation mechanism 20B of this embodiment is characterized by a constitution for which a plurality of operating members 22B are provided. Specifically, the opening-closing activation mechanism 20B has two operating members 22B arranged in the right angle direction which is upward of the valve opening-closing mechanism 30B. The operating member 22B is pivoted to be able to rotate by the axis support body 25B, is bent in an L shape, and is equipped with a pressing member 22Bc at its tip part. With this constitution, when the operating member 22B is pressed by the fueling gun FG, by pressing the opening-closing member 31B of the valve opening-closing mechanism 30B using the pressing member 22Bc, the opening-closing member 31B is rotated and the inlet opens. With this embodiment, it is possible to reduce the load burden by dispersing the operating force received from the fueling gun FG by the operating member 22B, and it is possible to increase the degree of freedom of the installation location of the opening-closing activation mechanism 20B.

(2) The operating member 22 of the opening-closing activation mechanism 20 does not have to be constituted to be biased in the closing direction by the spring, and can also be handled using fitting dimensions and the like that can prevent looseness that comes with vehicle vibration.

(3) With the embodiments noted above, the pressing member 22c of the opening-closing activation mechanism 20 is constituted provided projecting from the bottom part of the operating member main body 22a, but the invention is not limited to this, and is acceptable as long as it is a constitution capable of pressing the opening-closing member 31 of the valve opening-closing mechanism 30, for example can have the tip part of the opening-closing member constituted by a curved surface.

(4) With the embodiments noted above, the opening-closing activation mechanism 20 is constituted so as to rotate by being pressed by the fueling gun FG, but the invention is not limited to this, and it is also possible to have a constitution for which rotation is done by receiving the operating force that moves in conjunction with the external force when the fueling lid is opened.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A tank opening-closing device for opening and closing an inlet for supplying fuel to a fuel tank, the tank opening-closing device comprising:
   a tank opening forming member having the inlet, and a fuel path for leading the fuel to the fuel tank through the inlet,
   a valve opening-closing mechanism having (i) an opening-closing member including a pivot at the tank opening forming member, the opening-closing member pivoting about the pivot and closing the inlet with an air-tight sealing, and (ii) a spring for biasing the opening-closing member in a closing direction, and an opening-closing activation mechanism having (i) an operating member including a pivot at one end thereof, and (ii) a pressing member for pressing the opening-closing member in an opening direction; the operating member including a plate-shaped operating member main body, the pressing member formed on the operating member and protruding from a bottom of the plate-shaped operating member main body, wherein the bottom of the plate-shaped operating member main body faces the opening-closing member, wherein the opening-closing member has a pressing position arranged toward an end thereof opposite the pivot and the pressing position extends in a radial direction from a center of the opening-closing member, the opening-closing activation mechanism and the pressing member work together and are configured to pivot open the opening-closing member and open the inlet by the pressing member pressing a surface of the pressing position of the opening-closing member in the opening direction and the pressing member sliding along the surface of the pressing position of the opening-closing member.

2. The tank opening-closing device in accordance with claim 1, wherein the operating member comprises a guide recess with a curved surface that is pressed so as to adapted to receive a tip part of a fueling gun and to press and rotate the operating member while sliding the tip part of the fueling gun when pressed by in response to pressure from the tip part of the fueling gun.

3. The tank opening-closing device in accordance with claim 2, wherein the pressing member is formed in a curved surface for which the sliding friction coefficient decreases in relation to the opening-closing member.

4. The tank opening-closing device in accordance with claim 3, wherein the opening-closing member comprises a pressure regulating valve for regulating inner pressure of the fuel tank and atmospheric pressure within a preset range.

5. The tank opening-closing device in accordance with claim 1, wherein the pressing member is formed in a curved surface for which the sliding friction coefficient decreases in relation to the opening-closing member.

6. The tank opening-closing device in accordance with claim 1, wherein the opening-closing member comprises a pressure regulating valve for regulating inner pressure of the fuel tank and atmospheric pressure within a preset range.

7. The tank opening-closing device in accordance with claim 1, wherein the pressing member is formed in a curved surface for which the sliding friction coefficient decreases in relation to the opening-closing member.

8. A tank opening-closing device for opening and closing an inlet for supplying fuel to a fuel tank, the tank opening-closing device comprising:

a tank opening forming member having the inlet, and a fuel path for leading the fuel to the fuel tank through the inlet;

a valve opening-closing mechanism having (i) an opening-closing member including a pivot at the tank opening forming member, the opening-closing member pivoting about the pivot and closing the inlet with an air-tight sealing, and a spring for biasing the opening-closing member in a closing direction; and an opening-closing activation mechanism having (i) an operating member including a pivot at one end thereof, and (ii) a pressing member for pressing the opening-closing member in an opening direction; the operating member including a plate-shaped operating member main body, the pressing member formed on the operating member and protruding from a bottom of the plate-shaped operating member main body, wherein the bottom of the plate-shaped operating member main body faces the opening-closing member, wherein the opening-closing member has a pressing position arranged toward an end opposite the pivot and the pressing position extends in a radial direction from a center of the opening-closing member, the opening-closing activation mechanism and the pressing member work together and are configured to pivot open the opening-closing member and open the inlet by the pressing member pressing a surface of the pressing position of the opening-closing member in the opening direction.

9. The tank opening-closing device in accordance with claim 8, wherein the operating member comprises a guide recess with a curved surface that is pressed so as to adapted to receive a tip part of a fueling gun and to press and rotate the operating member while sliding the tip part of the fueling gun when pressed by in response to pressure from the tip part of the fueling gun.

10. The tank opening-closing device in accordance with claim 9, wherein the pressing member is formed in a curved surface for which the sliding friction coefficient decreases in relation to the opening closing member.

11. The tank opening-closing device in accordance with claim 10, wherein the opening-closing member comprises a pressure regulating valve for regulating inner pressure of the fuel tank and atmospheric pressure within a preset range.

12. The tank opening-closing device in accordance with claim 8, wherein the pressing member is formed in a curved surface for which the sliding friction coefficient decreases in relation to the opening-closing member.

13. The tank opening-closing device in accordance with claim 8, wherein the pressing member is formed in a curved surface for which the sliding friction coefficient decreases in relation to the opening-closing member.

* * * * *